United States Patent [19]
Evers et al.

[11] 3,764,601
[45] Oct. 9, 1973

[54] CYCLOPENTAPYRIMIDINES
[75] Inventors: William J. Evers, Atlantic Highland; Manfred H. Vock, West Orange, both of N.J.
[73] Assignee: International Flavors & Fragrances Inc., New York, N.Y.
[22] Filed: Mar. 10, 1971
[21] Appl. No.: 123,023

[52] U.S. Cl............ 260/251 A, 99/140 R, 131/144
[51] Int. Cl............................................ C07d 51/46
[58] Field of Search................................ 260/251 A

[56] References Cited
UNITED STATES PATENTS
2,969,361   1/1961   Thompson......................... 260/251

OTHER PUBLICATIONS
Polonovski et al., - C. A. 42, 5854 (1948)

Primary Examiner—Alex Mazel
Assistant Examiner—R. V. Rush
Attorney—Brooks, Haidt & Hoffner

[57] ABSTRACT

Processes for altering the flavors of consumable products, including foodstuffs and tobaccos, which comprise adding thereto a small but effective amount of at least one cyclopentapyrimidine having the formula

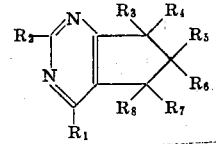

wherein $R_1$ is alkyl, alkoxy, alkylthio, cycloalkylthio or hydrogen; $R_2$ is hydrogen, alkyl or alkylthio; and $R_3$, $R_4$, $R_5$, $R_6$, $R_7$ and $R_8$ are the same or different and are hydrogen or alkyl, preferably lower alkyl containing from one to three carbon atoms; with the proviso that $R_1$ and $R_2$ are not both alkylthio; flavoring and flavor-enhancing compositions containing such cyclopentapyrimidines; and novel cyclopentapyrimidines and processes for the preparation of such cyclopentapyrimidines.

15 Claims, No Drawings

CYCLOPENTAPYRIMIDINES

The present invention relates to cyclopentapyrimidines and their use in processes and compositions for altering the flavors of various materials such as foodstuffs, tobaccos, and the like, as well as such novel pyrimidines and processes for producing them.

Various substituted pyrimidines have been shown in the art. U.S. Pat. No. 2,969,361 shows 4-chloro-6,7-dihydro-2-methyl-5H-cyclopenta-[d]-pyrimidine which is said to have a popcorn odor but no other flavoring, enhancing or other organoleptic properties are shown or suggested. German Auslegeschrift 1,114,497 shows 4- and 5- substituted pyrimidines including cyclopentapyrimidines and suggests that these compounds may be used as intermediates for pharmaceuticals and in chemical synthesis. No flavoring, enhancing or other organoleptic properties are suggested for the compounds shown. Nor are any of the novel cyclopentapyrimidines of the present invention shown in said German Auslegeschrift. Chemical Abstracts, 52, 7323e (1958) shows 4-methyl-5,6-tetramethylenepyrimidine but does not suggest any use for this compound. J. Am. Chem. Soc., 81, 1959, pp. 3108-3114, sets forth a synthesis of 6,7-dihydro-5H-cyclopenta-(d)-pyrimidine. Dutch published application 68/1299 states that 2-methyl-5H-6,7-dihydrocyclopenta-(b) pyrazine and 5-methyl-5H-6,7-dihydrocyclopenta-(b) pyrazine have a chocolate or peanut flavor, respectively.

It has now been found that certain cyclopentapyrimidines, including certain novel cyclopentapyrimidines, are capable of imparting a wide variety of flavors to various consumable materials. Briefly, the invention contemplates altering the flavors of such consumable materials by adding thereto a small but effective amount of at least one cyclopentapyrimidine having the formula

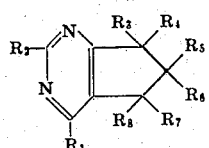

wherein $R_1$ is alkyl, alkoxy, alkylthio, cycloalkylthio or hydrogen; $R_2$ is hydrogen, alkyl or alkylthio and $R_1$ and $R_2$ are not both alkylthio; and $R_3$, $R_4$, $R_5$, $R_6$, $R_7$ and $R_8$ are the same or different and are hydrogen or lower alkyl containing from one to three carbon atoms. Where $R_2$ is not hydrogen, the aforementioned compounds are novel. It is generally preferred in practicing this invention that the alkyl groups preferably contain from one to four carbon atoms, the alkoxy groups contain preferably from one to four carbon atoms, the alkylthio groups contain preferably from one to three carbon atoms and the cycloalkylthio groups contain preferably from three to five carbon atoms. The invention also contemplates flavoring and flavor-enhancing compositions containing such cyclopentapyrimidines, as well as the novel pyrimidines and the processes for preparing them. More specifically, the cyclopentapyrimidines according to this invention are pyrimidines to the d side of which is fused a five-membered hydrocarbon ring.

A cyclopentapyrimidine according to the present invention is 6,7-dihydro-5H-2-methyl-cyclopenta-[d]-pyrimidine having the structure

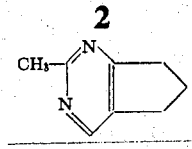

This is a white crystalline solid having sweet cracker type nut notes with a roasted nutty popcorn character.

Another compound according to the present invention is 4-methoxy-6,7-dihydro-5H-2-methyl-cyclopenta-[d]-pyrimidine having the structure

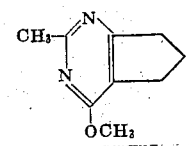

This material has a boiling point of 63°–64°C at 0.25 mm Hg and has a nutty flavor.

Still another compound according to the present invention is 4-ethoxy-6,7-dihydro-5H-2-methyl-cyclopenta-[d]-pyrimidine having the structure

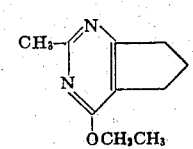

This is a very pale yellow liquid with a boiling point of 63°–64°C at 0.25 mm Hg. This material has nutty notes and may be used in flavors for baked goods.

Another material according to the present invention is 4-n-propoxy-6,7-dihydro-5H-2-methyl-cyclopenta-[d]-pyrimidine having the structure

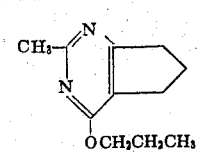

This is a colorless liquid with a boiling point of 81°–83°C at 0.15 mm HG and has a sweet, roasted nut flavor.

Another material according to the present invention is 4-isobutoxy-6,7-dihydro-5H-2-methyl-cyclopenta-[d]-pyrimidine having the structure

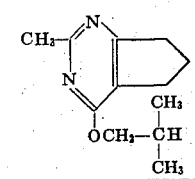

This is a colorless liquid with a boiling point of 77°C at 0.15 mm HG and has fruity, nutty notes with a light buttery aftertaste.

Another material according to the present invention is 2-methylthio-6,7-dihydro-5H-cyclopenta-[d]-pyrimidine having the structure

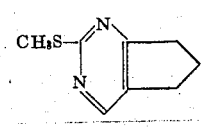

This material is a yellow solid with a fried onion flavor.

Still another material according to the present invention is 4-n-propylthio-6,7-dihydro-5H-2-methyl-cyclopenta-[d]-pyrimidine having the structure

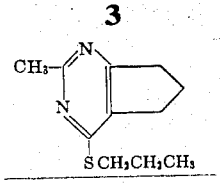

This is a yellow liquid with a boiling point of 99°–101°C.

Another material exemplifying the present invention is 4-methylthio-6,7-dihydro-5H-2-methyl-cyclopenta-[d]-pyrimidine having the structure

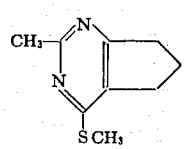

This is a light yellow solid with a nutty, green vegetable aroma and taste.

Still another material exemplifying the present invention is 4-cyclopentylthio-6,7-dihydro-5H-2-methylcyclopenta-[d]-pyrimidine having the structure

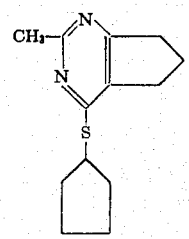

This is a very light amber liquid with a boiling point of 116°–118°C at 0.15 mm Hg and has a sweet onion taste.

The novel cyclopentapyrimidines prepared according to the present invention can be obtained by a number of reaction routes.

The 6,7-dihydro-5H-2-alkyl-cyclopenta-[d]-pyrimidines, for example, 6,7-dihydro-5H-2-methyl-cyclopenta-[d]-pyrimidine can be obtained by a reductive dehalogenation of the corresponding 4-halo-6,7-dihydro-5H-2-alkyl-cyclopenta-[d]-pyrimidines. This reaction is carried out under pressure in an aqueous solution in the presence of a suitable solvent, e.g., ethers such as diethylether, aromatic hydrocarbons such as benzene, toluene and the like. The halo compounds which are useful are the chloro, bromo and iodo compounds. A catalyst is desirable and suitable catalysts include palladium, platinum, and Raney nickel and the catalyst is preferably supported on a carrier, e.g., carbon. The pressure utilized is generally below 10 atmospheres. The reaction is deemed complete when the theoretical quantity of hydrogen is consumed.

The 4-alkoxy-6,7-dihydro-5H-2-alkyl-cyclopenta-[d]-pyrimidines, for example, 4-methoxy-6,7-dihydro-5H-2-methylcyclopenta-[d]-pyrimidine, can be obtained by an etherification reaction of the corresponding 4-halo-6,7-dihydro-5H-2-alkyl-cyclopenta-[d]-pyrimidines. The halo compounds which are useful are the chloro, bromo and iodo compounds. The reaction is carried out by forming an alkali metal alkoxide and reacting the alkoxide with the 4-halo-6,7-dihydro-5H-2-alkylcyclopenta-[d]-pyrimidine under reflux conditions resulting in a displacement of the halo substituent by the alkoxy substituent.

The 4-alkylthio-6,7-dihydro-5H-2-alkyl-cyclopenta-[d]-pyrimidines, for example, 4-methylthio-6,7-dihydro-5H-2-methyl-cyclopenta-[d]-pyrimidine and the 4-cycloalkylthio-6,7-dihydro-5H-2-alkyl-cyclopenta-[d]-pyrimidines, for example, 4-cyclopentylthio-6,7-dihydro-5H-2-methyl-cyclopenta-[d]-pyrimidine, can be obtained by reacting the corresponding 4-halo-6,7-dihydro-5H-2-alkyl-cyclopenta-[d]-pyrimidines with a suitable alkyl mercaptan or cycloalkylmercaptan, respectively in a suitable solvent. The halo compounds which are useful are the chloro, bromo and iodo compounds. The reaction is preferably carried out in a solvent, e.g., ethanol, methanol and isopropanol and under reflux conditions.

The 2-alkylthio-6,7-dihydro-5H-cyclopenta-[d]-pyrimidines, for example, 2-methylthio-6,7-dihydro-5H-cyclopenta-[d]-pyrimidine can be obtained by a reductive dehalogenation of the corresponding 4-halo-6,7-dihydro-5H-cyclopenta-[d]-pyrimidine. This reaction is carried out under reflux conditions in the presence of zinc dust and ammonium chloride.

The cyclopentapyrimidines of the present invention are thus prepared from the corresponding 4-halo-6,7-dihydro-5H-cyclopenta-[d]-pyrimidine as described. When cyclopentapyrimidines according to the present invention wherein the cyclopenta ring is monoalkyl-substituted or polyalkyl-substituted are desired, they can be prepared by reacting a mono-, or polyalkyl-substituted 2-carbethoxycyclopentanone with acetamidine at temperatures of from about 40° to 50°C with good stirring. Such substituted cyclopentanone carboxylic acids are known, as for example, 3-methylcyclopentanone-2-carboxylic acid-1, Beilstein, E II, No. 10, p. 422, 1,3-dimethylcyclopentanone-2-carboxylic acid-1, Beilstein, A II, No. 10, p. 424, 3-methyl-1-propylcyclopentanone-5-carboxylic acid-1, Beilstein, A II, No. 10, p. 430. The reaction with acetamidine provides the hydroxy cyclopentapyrimidine which is then converted to the corresponding halo cyclopentapyrimidine according to the method shown in U.S. Pat. No. 2,969,361. The halo cyclopentapyrimidine is subsequently reductively dehalogenated as herein shown.

It will be understood by those skilled in the art that the intermediate and the final products prepared herein are neutralized, washed, and dried to obtain the desired substances. The novel cyclopentapyrimidines can be obtained in purer form or in substantially pure form by conventional purification techniques. Thus, the products can be purified and/or isolated by distillation, extraction, crystallization, preparative chromatographic techniques, and the like.

It will be appreciated from the present disclosure that the cyclopentapyrimidines and mixtures thereof according to the present invention can be used to alter, vary, fortify, modify, enhance, or otherwise improve the flavor of a wide variety of materials which are ingested, consumed, or otherwise organoleptically sensed. The term "alter" in its various forms will be understood herein to mean the supplying or imparting of a flavor character or note to an otherwise bland, relatively tasteless substance, or augmenting an existing flavor characteristic where the natural flavor is deficient in some regard, or supplementing the existing flavor impression to modify the organoleptic character.

Such pyrimidines are accordingly useful in flavoring compositions. Such a composition is taken to mean one which contributes a part of the overall flavor impression by supplementing or fortifying a natural or artificial flavor in a material, as well as one which supplies substantially all the flavor and/or aroma character to a consumable article. The cyclopentapyrimidines of our invention are particularly useful in adding sweetness and nut notes to artificial essential oils, peppermint oil and spearmint oil. They are also suitable for rounding out and improving the character of nut, bread, and vanilla flavoring compositions.

The term "foodstuff" as used herein includes both solid and liquid ingestible materials for man or animals, which materials usually do, but need not, have nutritional value. Thus, foodstuffs include meats, gravies, soups, convenience foods, malt and other alcoholic or non-alcoholic beverages, milk and dairy products, nut butters such as peanut butter and other spreads, seafoods including fish, crustaceans, molluscs and the like, candies, breakfast foods, baked goods, vegetables, cereals, soft drinks, snack foods, dog and cat foods, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like, as well as tobacco substitutes intended to replace natural tobacco, such as lettuce and cabbage leaves and the like. The tobaccos and tobacco products include those designed or used for smoking such as in cigarette, cigar, and pipe tobacco, as well as product such as snuff, chewing tobacco, and the like.

The term "consumable material" include both foodstuffs and tobacco.

When the cyclopentapyrimidines according to this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners and flavor intensifiers.

Such conventional flavoring materials include saturated and unsaturated fatty and amino acids, alcohols, including primary and secondary alcohols; esters; carbonyl compounds including ketones and aldehydes; lactones; other cyclic organic materials including benzene derivatives, alicycles, heterocyclics such as furans, pyridines, pyrazines and the like; sulfur-containing materials including thiols, sulfides, disulfides and the like; proteins; lipids; carbo-hydrates; so-called flavor potentiators such as monosodium glutamate, guanylates, and inosinates; natural flavoring materials such as cocoa, vanilla and caramel; essential oils and extracts such as anise oil, clove oil and the like; artificial flavoring materials such as vanillin; and the like.

Stabilizers include preservatives such as sodium chloride, and the like; antioxidants such as calcium and sodium ascorbate, ascorbic acid, butylated hydroxyanisole, butylated hydroxytoluene, propyl gallate and the like; sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches and pectins.

Surface active agents include emulsifying agents such as mono-and/or diglycerides of fatty acids such as capric acid, caprylic acid, palmitic acid, myristic acid, oleic acid, and the like; lecithin; defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents such as sodium acetate, ammonium bicarbonate, ammonium phosphate, citric acid, lactic acid, vinegar and the like; colorants such as carminic acid, cochineal, turmeric, curcumin, approved food and drug dyes, and the like; firming agents such as aluminum sodium sulfate, calcium chloride and calcium gluconate; texturizes; anti-caking agents such as aluminum calcium sulfate and tribasic calcium phosphate; enzymes, yeast foods such as calcium lactate and calcium sulfate; nutrient supplements such as iron salts, such as ferric phosphate, ferric pyrophosphate, ferrous gluconate and the like; riboflavin, vitamins; zinc sources such as zinc chloride, zinc sulfate, and the like.

The cyclopentapyrimidines, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The pyrimidines can be incorporated with the carriers by conventional means such as spray-drying, drum-drying, and the like. Such carriers can also include materials for coacervating the pyrimidines (and other flavoring ingredients, as present) to provide encapsulated products. When the carrier is an emulsion, the flavoring composition can also contain emulsifiers such as mono- and diglycerides of fatty acids and the like. With these carriers or vehicles, the desired physical form of the composition can be prepared.

It will be understood by those skilled in the art that the cyclopentapyrimidines can be added to the materials to be flavored at any convenient point in the production of the finished product. Thus, when the pyrimidines are used to alter or otherwise vary the flavor of a foodstuff, they can be added in the original mixture, dough, emulsion, batter, or the like, prior to any cooking or heating operation. Alternatively, they can be added at a later stage of processing if volatilization losses would be excessive during the earlier processing.

When the materials are used to treat tobacco products, for example, the additive can be applied in a suitable manner by spraying, dipping or otherwise. The pyrimidines can be applied during the "casing" or final spray treatment of the tobacco, or they can be applied at some earlier stage of curing. The quantity of cyclopenta-pyrimidines or mixtures thereof utilized should be sufficient to impart the desired flavor characteristic to the product, but on the other hand, the use of an excessive amount of the cyclopentapyrimidines is not only wasteful and uneconomical but in some instances too large a quantity may unbalance the flavor or other organoleptic property of the product to be consumed. The quantity used will vary depending upon the ultimate foodstuff, tobacco product, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer.

It is accordingly preferred that the ultimate compositions contain from about 0.1 part per million (ppm) to about 100 ppm of the cyclopentapyrimidines. More particularly, in food compositions it is desirable to use from about 0.1 to about 20 ppm and in certain preferred embodiments of the invention, from about 1 to about 15 ppm of the cyclopentapyrimidines are included in the finished product. On the other hand, tobacco compositions can contain as little as 0.1 ppm and as much as 100 ppm, depending upon whether a cigarette tobacco, a pipe tobacco, a cigar tobacco, a chewing tobacco, or snuff is being prepared. All parts, proportions, percentages, and ratios herein are by weight unless otherwise indicated.

The amount of cyclopentapyrimidine or pyrimidines to be utilized in flavoring or flavor-enhancing compositions can be varied over a wide range depending upon a particular quality to be added to the foostuff, tobacco, or other consumable material. Thus, amounts of one or more cyclopenta-pyrimidines according to the present invention from about 0.1 up to 80 or 90 percent can be incorporated in such compositions. It is generally found to be desirable to include from about 0.5 to about 25 percent of the cyclopentapyrimidines in such compositions.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 6,7-dihydro-5H-2-methyl-cyclopenta-[d]-pyrimidine

A Parr hydrogenation apparatus is charged with 33.7 g. of 4-chloro-6,7-dihydro-5H-2-methyl-cyclopenta-[d]-pyrimidine, 150 ml. of diethylether, 25 ml. of water, 8.8 g. of sodium hydroxide and 800 mg. of a 5 percent palladium on carbon catalyst. An initial hydrogen pressure of 33 psi is allowed to drop to 15 psi at which point the reduction is complete. The sample is then removed, the ether layer is decanted and the aqueous layer extracted thrice with 100 ml. portions of ether and the filtrates combined. After drying, the solvent is removed in vacuo leaving 22.8 g. of a white, crystalline solid. Recrystallization from hexane gives 16.0 g. of 6,-7-dihydro-5H-2-methyl-cyclopenta-[d]-pyrimidine.

The melting point of this white crystalline solid is 55°C. Nuclear magnetic resonance (NMR) in deutero-chloro-form shows 8.41 (s, 1 proton), 2.94 (m, 4 protons), 2.69 (s, 3protons), and 2.11 (m, 2 protons) ppm. Mass spectroscopy (molecular ion then decreasing intensity): 134, 39, 106, 133, 42, 66 and 93.

The 6,7-dihydro-5H-2-methyl-cyclopenta-[d]-pyrimidine has sweet cracker-type nut notes with a roasted nutty popcorn and whey character. It also has a very pleasant sweet milk aftertaste. This compound has use in all flavor areas where sweet notes are desired, e.g. milk flavors, rice flavors, breakfast cereals, sweet baked goods, vanilla flavors and milk chocolate flavors.

The 6,7-dihydro-5H-2-methyl-cyclopenta-[d]-pyrimidine of the present invention is compared with the 4-chloro-6,7-dihydro-2-methyl-5H-cyclopenta-[d]-pyrimidine of the prior art (U.S. Pat. No. 2,969,361). The cyclopentapyrimidine of the present invention is found to have a stronger popcorn aroma than the prior art compound and a highly desirable milk vanilla taste whereas the prior art compound has a very strong lingering bitter aftertaste which overcomes its aroma notes and limits its use in flavors. It has a threshold level of about 0.2 ppm and a use level in the range of 2–50 ppm.

EXAMPLE II

Preparation of 4-methoxy-6,7-dihydro-5H-2-methyl-cyclopenta-[d]-pyrimidine

An apparatus consisting of a 250 ml. three-neck reaction flask equipped with a reflux condenser. thermometer and magnetic stirrer is changed with 100 ml. of methanol to which 0.5 g. (0.022 g. -atoms) of sodium metal is slowly added with stirring until a solution results. A 3.0 g. (0.018 mol) portion of 4-chloro-6,7-dihydro-5H-2-methylcyclopenta-[d]-pyrimidine is then added and the mixture is heated at reflux for a period of two hours. The methanol is then decanted from the sodium chloride and the methanol is removed in vacuo. The solid-liquid phase which remains is extracted twice with 25 ml. portions of diethylether. The diethylether extracts are filtered and concentrated to a pink oil weighing 2.8 g. which is then distilled in vacuo through a short path distillation apparatus to yeild 2.21 g. of a compound having a boiling point of about 67°C at 0.5 mm Hg. NMR in deuterochloroform shows 3.95 (s, 3 protons), 2,87 (m, 4 protons), 2.57 (s, 3 protons) and 2.06 (m, 2 protons) ppm; mass spectroscopy m/e (molecular ion then decreasing relative intensity): 164, 163, 149, 93, 65, 135 and 134 mass units. These data confirm that this material is 4-methoxy-6,7-dihydro-5H-methyl-cyclopenta-[d]-pyrimidine.

The 4-methoxy-6,7-dihydro-5H-2-methyl-cyclopenta-[d]-pyrimidine has charred nut and cracker notes with a pleasant sweet fatty nut character. It is suitable for use in cracker, nut, cereal, butter-fat and tabacco flavors. It has a threshold level of 0.5 ppm and a use level of 2–80 ppm.

EXAMPLE III

Preparation of 4-ethoxy-6,7-dihydro-5H-2-methyl-cyclopenta-[d]-pyrimidine

An apparatus consisting of a 250 ml. three-neck, semi-micro reaction flask, equipped with a reflux condenser, thermometer, drying tube and magnetic stirrer is charged with 100 ml. of ethanol to which 0.5 g (0.022 g. - atoms) of sodium metal is slowly added with stirring until the sodium is completely dissolved. A 3.0 g. (0.018 mol) portion of 4-chloro-6,7-dihydro-5H-2-methyl-cyclopenta-[d]-pyrimidine is then added and the mixture is heated at reflux for a period of 2 hours. The solution is then cooled and the white sodium chloride precipitate is filtered and the solid-liquid phase which remains is extracted with methylene chloride.

The extracts are concentrated to a yellow oil weighing 2.8 g. which is then distilled in Vacuo through a semi-micro, short path distillation apparatus to yeild 2.28 g. of a very pale yellow liquid with a boiling point of 63°–64°C at 0.25 mm Hg. NMR in deuterochloroform shows 4.43 (q, 2 protons), 2.84 (m, 4 protons), 2.57 (s, 3 protons), 2.06 (m, 2 protons), and 1.36 (t, 3 protons) ppm; mass spectroscopy m/e (molecular ion then decreasing relative intensity): 178, 163, 150, 27, 149, 29 and 42 mass units. These data confirm that this material is 4-ethoxy-6,7-dihydro-5H-2-methyl-cyclopenta-[d]-pyrimidine.

The 4-ethoxy-6,7-dihydro-5H-2-methyl-cyclopenta-[d]-pyrimidine has nutty notes and is suitable for nut flavors and flavors for baked goods with a use level of 2–50 ppm and a threshold level of about 0.5 ppm.

EXAMPLE IV

Preparation of 4-n-propoxy-6,7-dihydro-5H-2-methyl-cyclopenta-[d]-pyrimidine

An apparatus consisting of a 250 ml. three-neck reaction flask, equipped with a reflux condenser, thermometer, drying tube and magnetic stirrer is charged with 100 ml. of n-propanol to which 0.5 g. (0.022 g.-atoms) of sodium metal is slowly added with stirring until the sodium is completely dissolved. A 3.0 g. (0.018 mol) portion of 4-chloro-6,7-dihydro-5H-2-methyl-cyclopenta-[d]-pyrimidine is then added and the mixture is heated at reflux for a period of 2 hours. The resulting mixture is cooled and the sodium chloride is filtered leaving an amber solution. The solution is concentrated in vacuo to remove the excess n-propanol and the product is then extracted with 25 ml. portions of methylene chloride. The extracts are filtered and concentrated to 2.6 g. of a light brown oil. The coil is then distilled in vacuo through a short path distillation apparatus to yield 1.62 g. of a colorless liquid, having a boiling point of 81°–83°C at 0.15 mm Hg. NMR in deuterochloroform shows 4.30 (t, 2 protons), 2.83 (m 4 protons), 2.57 (s, 3 protons), 2.06 (m, 2 protons), 1.78 (m, 2 protons) and 1.00 (t, 3 protons) ppm; mass spectroscopy m/e (molecular ion then decreasing relative intensity): 192, 150, 149, 163, 27 and 42 mass units. These data confirm that this material is 4-n-propoxy-6,7-dihydro-5H-2-methyl-cyclopenta-[d]-pyrimidine.

This compound has sweet, roasted nut notes and is suitable for cracker, bread, nut and meat gravy flavors with a use level of 5–10 ppm and a threshold level of 0.5 ppm.

EXAMPLE V

Preparation of 4-isobutoxy-6,7-dihydro-5H-2-methyl-cyclopenta-[d]-pyrimidine

An apparatus consisting of a 250 ml. three-neck reaction flask equipped with a reflux condenser, thermometer, drying tube and magnetic stirrer is charged with 100 ml. of isobutanol to which 0.5 g. (0.022 g.-atoms) of sodium metal is slowly added with stirring until the sodium is completely dissolved. A 3.0 g. (0.018 mol) portion of 4-chloro-6,7-dihydro-5H-2-methyl-cyclopenta-[d]-pyrimidine is then added and the mixture is heated at reflux for a period of 2 hours. The resulting mixture is cooled and the sodium chloride is filtered and the filtrate is concentrated to a pale brown oil containing some solid. The compound is extracted from the excess sodium isobutoxide with 25 ml. of methylene chloride and the methylene chloride solution is then filtered and concentrated to 4.2 g. of a brown oil containing some solid and is left standing overnight. The material is then distilled through a short path distillation apparatus to yield 1.46 g. of a brown liquid with a boiling point of 77°C at 0.15 mm Hg. NMR in deuterochloroform shows 4.03 (d, 2 protons), 2.84 (m, 4 protons), 2.56 (s, 3 protons), 2.05 (m, 2 protons) and 1.99 (d, 6 protons) ppm; mass spectroscopy m/e (molecular ion then decreasing relative intensity): 206, 150, 149, 42, 41 and 65 mass units. These data confirm that this material is 4-isobutoxy-6,7-dihydro-5H-2-methylcyclopenta-[d]-pyrimidine.

This compound has fruity, roasted fresh nut notes with a light buttery after taste and is suitable for use in nut, baked goods, gravey, meat and fruit flavors with use levels in the range of 2–100 ppm and a threshold level of about 0.5 ppm.

EXAMPLE VI

Preparation of 2-methylthio-6,7-dihydro-5H-cyclopenta-[d]-pyrimidine

An apparatus consisting of a 250 ml. three-neck reaction flask equipped with a reflux condenser, thermometer and magnetic stirrer is charged with 4.8 g. (0.024 mol) of 4-chloro-2-methylthio-6,7-dihydro-5H-cyclopenta-[d]-pyrimidine (prepared according to the procedures of Ross et al, J. Am. Chem. Soc., 81, 3108–3114 [1959]) and 50 ml. of ethanol and heated with stirring until solution results. To this solution is added 6.3 g. (0.096 g.-atoms) of zinc dust and 0.64 g. (0.012 mol) of ammonium chloride in 25 ml. of water and reflux is begun. Samples are taken at 1 hour, 2 hours (0.65 g. of ammonium chloride are added) and 4 hours (1.3 g. of ammonium chloride are added) and reflux is stopped at 6-½ hours and the solution is permitted to stand at room temperature for 2 days. A 1.3 g. portion of ammonium chloride is added and reflux is begun again, an additional 1.3 g. of ammonium chloride is added at 2 hours and at 5-¾ hours and relux is stopped at 7-¾ hours and the solution is stirred over night. The reflux mixture is then concentrated to 50 ml. and extracted thrice with 50 ml. portions of methylene chloride. The extracts are combined and dried by filtration through sodium sulfate and the filtrate is concentrated to 3.5 g. of an amber oil. The material is then dissolved in 10 ml. of hexane and refiltered and concentrated in vacuo to 3.0 g. of a light yellow solid with a melting point of 48°C and a molecular weight of 166. NMR in deuterochloroform shows 8.3 (s, 1 proton), 2.86 (m, 4 protons) 2.54 (s, 3 protons) and 2.08 (m, 2 protons) ppm; mass spectroscopy m/e (molecular ion then decreasing relative intensity) : 166, 120, 39, 165 and 65 mass units. These data confirm that this material is 2-methylthio-6,7-dihydro-5H-cyclopenta-[d]-pyrimidine.

This material has a vegetable, pine needle aroma and taste leaving a bitter aftertaste. It is suitable for vegetable flavors at the rate of 5 ppm, and also for fragrance compositions.

EXAMPLE VII

Preparation of 4-n-propylthio-6,7-dihydro-5H-2-methyl-cyclopenta-[d]-pyrimidine

An apparatus consisting of a 250 ml. three-neck reaction flask equipped with a reflux condenser, thermometer and magnetic stirrer is charged with 100 ml. of ethanol and 0.90 g. (0.022 mol) of sodium hydroxide and is stirred to form a solution. A 1.7 g. (0.022 mol) portion of 1-propanethiol is added and the mixture is heated at 50°C over a 15 minute period and then 3.0 g. (0.018 mol) of 4-chloro-6,7-dihydro-5H-2-methyl-cyclopenta-[d]-pyrimidine is added and the mixture is heated at reflux for a period of 2 hours. The solvent is then removed in vacuo and 25 ml. of water are added and the solution is extracted thrice with 25 ml. portions of methylene chloride. The combined extracts are dried by filtration over sodium sulfate and concentrated to 3.8 g. of an oil. The yellow oil is then distilled in vacuo through a short path distillation apparatus to yield 2.2 g. of a yellow liquid with a boiling point of 99°–101°C. NMR in deuterochloroform shows 3.18 ($t$, 2 protons), 2.78 ($m$, 4 protons), 2.60 ($s$, 3 protons), 2.06 ($m$, 2 protons), 1.72 ($m$, 2 protons) and 1.10 ($t$, 3 protons) ppm; mass spectroscopy $m/e$ (molecular ion then decreasing relative intensity): 208, 166, 175, 165, 65 and 39 mass units. These data confirm that this material is 4-n-propylthio-6,7-dihydro-5H-2-methylcyclopenta-[d]-pyrimidine. This compound has a weak, sweet cereal note.

EXAMPLE VIII

Preparation of 4-methylthio-6,7-dihydro-5H-2-methyl-cyclopenta-[d]-pyrimidine

An apparatus consisting of a 250 ml. three-neck reaction flask equipped with a reflux condenser, thermometer and magnetic stirrer is charged with 100 ml. of ethanol and 0.9 g. (0.022 mol) of sodium hydroxide and the solution is cooled to 0.5°C and 1.1 g. (0.022 mol) of methanethiol is added and the mixture is stirred at 0.5°C for 15 minutes. The mixture is then heated at reflux for a period of two hours. The solvent is then removed in vacuo and 25 ml. of water are added to the residue which is then extracted thrice with 25 ml. portions of methylene chloride. The combined extracts are dried by filtration through sodium sulfate and the filtrates are concentrated to yield 3.1 g. of a light yellow solid with a melting point of 48°C. NMR in deuterochloroform shows 2.81 ($m$, 4 protons), 2.63 ($s$, 3 protons), 2.56 ($s$, 3 protons) and 2.10 ($m$, 2 protons) ppm; mass spectroscopy $m/e$ (molecular ion then decreasing relative intensity): 180, 147, 65, 165, 106 and 39 mass units. These data confirm that this material is 4-methylthio-6,7-dihydro-5H-2-methyl-cyclopenta-[d]-pyrimidine.

This material has a green vegetable, pine needle, nutty aroma and taste.

EXAMPLE IX

Preparation of 4-cyclopentylthio-6,7-dihydro-5-H-2-methyl-cyclopenta-[d]-pyrimidine An apparatus consisting of a 250 ml. three-neck reaction flask equipped with a reflux condenser, thermometer and magnetic stirrer is charged with 100 ml. of ethanol and 1.5 g (0.036 mol) of sodium hydroxide and is stirred to form a solution. A 3.7 g. (0.036 mol) portion of cyclopentanethiol is added and the mixture is heated to 50°C over a 15 minute period and then 3.0 g. (0.018 mol) of 4-chloro-6,7-dihydro-5H-2-methyl-cyclopenta-[d]-pyrimidine is added and the mixture is heated at reflux for a period of two hours. The solvent is then removed in vacuo and 25 ml. of water is added and the solution is extracted thrice with 25 ml. portions of methylene chloride. The combined extracts are dried by filtration over sodium sulfate and concentrated to 5.2 g. of an amber oil. This material is distilled in vacuo through a short path distillation apparatus to yield 2.00 g. of a very light amber liquid with a boiling point of 116°–118°C at 0.15 mm Hg. NMR in deuterochloroform shows 4.17 ($m$, 1 proton), 2.83 ($m$, 4 protons), 2.60 ($s$, 3 protons), 2.11 ($m$, 6 protons) and 1.67 ($m$, 4 protons) ppm; mass spectroscopy $m/e$ (molecular ion then decreasing relative intensity): 234, 166, 201, 41, 165 and 69. These data confirm that this material is 4-cyclopentylthio-6,7-dihydro-5H-2-methyl-cyclopenta-[d]-pyrimidine.

This material has a pleasant, sweet onion taste with distinct meaty notes and is suitable for use in meat flavors at the rate of 5 ppm.

EXAMPLE X

The following mixture is prepared by refluxing for three hours and aging for 3 days:

| | Parts |
|---|---|
| L-cysteine hydrochloride | 66 |
| Carbohydrate-free vegetable protein hydrolysate | 23.20 |
| Thiamine hydrochloride | 66 |
| Water | 78.48 |

0.33 parts of 6,7-dihydro-5H-2-methyl-cyclopenta-[d]-pyrimidine are added to the above and the resulting mixture is spray dried using a sufficient amount of gum arabic to provide a composition containing one part flavor solids and one part gum arabic.

Upon drying, the resulting product has a flavor closely resembling that of natural beef.

EXAMPLE XI

A black walnut flavor is prepared by admixing the following ingredients:

| | Parts |
|---|---|
| Vanilla | 3 |
| Heliotropine | 3 |
| p-cresylphenyl acylate | 4 |
| Ethyl valerate | 5 |
| Amyl valerate | 5 |
| p-cresyl methylether | 5 |
| Patchouli essential oil | 2 |
| Sage clary 10% (alcohol 95%) | 2 |
| Aldehyde C-14 | 1 |
| Aldehyde C-18 | 1 |
| Benzaldehyde | 2 |
| Solid extract Fenugreek 10% (in propylene glycol/water 1:1) | 500 |
| Propylene glycol | 467 |
| 4-isobutoxy-6,7-dihydro-5H-2-methyl-cyclopenta-[d]-pyrimidine | 5 |

Use of the 4-isobutoxy-6,7-dihydro-5H-2-methyl-cyclopenta-[d]-pyrimidine at the rate of 0.5 percent improves the nut like character of this flavor in such a manner as to give it a close resemblance to "natural" black walnut flavor; more so than if the pyrimidine material is omitted.

EXAMPLE XII

A cake flavor is prepared by admixing the following ingredients:

| | Parts |
|---|---|
| Vanilla | 40 |
| Ethylvanillin | 15 |
| Benzodihydropyrone | 5 |
| Rum ether | 5 |
| Alcohol (95%) | 235 |
| Propylene glycol | 400 |

| | Parts |
|---|---|
| Water | 300 |
| 4-methoxy-6,7-dihydro-5H-2-methyl-cyclopenta-[d]-pyrimidine | 30 |

The above flavor is added to a prepared cake mix (1 oz/100 lbs) and upon baking the resultant cake has a sweet improved vanilla taste with buttery notes, more so than a cake prepared with the above flavor not containing the pyrimidine material.

EXAMPLE XIII

A cake flavor is prepared by admixing the following ingredients:

| | Parts |
|---|---|
| Vanilla | 40 |
| Benzodihydropyrone | 4 |
| Rum ether | 5 |
| Alcohol (95%) | 235 |
| Propylene glycol | 400 |
| Water | 300 |
| 4-ethoxy-6,7-dihydro-5H-2-methyl-cyclopenta-[d]-pyrimidine | 30 |

The above flavor is added to a prepared cake mix (1 oz/100 lbs) and upon baking, the resultant cake has an excellent sweet-baked vanilla taste, more so than a cake prepared with the above flavor not containing the pyrimidine material.

EXAMPLE XIV

A confection center is prepared from the following ingredients:

| | Parts |
|---|---|
| Peanut butter | 300 |
| Ground sweet cracker meal | 100 |
| Confectioners sugar | 200 |
| Shortening | 25 |

When 5 ppm of 4-ethoxy-6,7-dihydro-5H-2-methylcyclopenta-[d]-pyrimidine is added to the confection center composition, a fuller, richer flavor character is obtained.

EXAMPLE XV

A commercially available peanut butter is modified to contain 5 ppm of 6,7-dihydro-5H-2-methyl-cyclopenta-[d]-pyrimidine, and the modified peanut butter is tested against the unmodified peanut butter (that is, the peanut butter without the added pyrimidine material) and is found to have a greater peanut taste intensity.

EXAMPLE XVI

An imitation butter popcorn flavored concentrate containing 4-cyclopentylthio-6,7-dihydro-5H-2-methylcyclopenta-[d]-pyrimidine in an amount of 0.6 percent by weight is formulated as follows:

| | Parts |
|---|---|
| Propylene glycol | 704.5 |
| 2-acetyl pyrazine | 0.5 |
| Benzilidine acetone | 3.0 |
| Cinnamic aldehyde | 4.0 |
| Heliotropin | 5.0 |
| Valeric acid | 6.0 |
| Cinnamyl butyrate | 9.0 |
| Ethyl butyrate | 10.0 |
| Benzodihydropyrone | 12.0 |
| Vanillin | 40.0 |
| Lactic acid | 50.0 |
| Butyric acid | 100.0 |
| Diacetyl | 50.0 |
| 4-cyclopentylthio-6,7-dihydro-5H-2-methyl-cyclopenta-[d]-pyrimidine | 6.0 |

EXAMPLE XVII

A "corn chip" snack product is produced as follows:
The solution of Example XVI is sprayed onto a bland corn-based chip in order to give an approximate level of 0.04 percent by weight. The resulting product is then air-dried and is found to have a butter-popcorn flavor and aroma preferred over the untreated chips.

EXAMPLE XVIII

The following mixture is prepared by refluxing for three hours and aging for three days:

| | Parts |
|---|---|
| L-cysteine hydrochloride | 66 |
| Carbohydrate-free vegetable protein hydrolysate | 23.20 |
| Thiamine hydrochloride | 66 |
| Water | 78.48 |

0.33 parts of 6,7-dihydro-5H-cyclopenta-[d]-pyrimidine is added to the above and the resulting mixture is spray dried using a sufficient amount of gum arabic to provide a composition containing one part flavor solids and one part gum arabic.

Upon drying, the resulting product has a flavor closely resembling that of natural beef.

What is claimed is:

1. A cyclopentapyrimidine having the formula

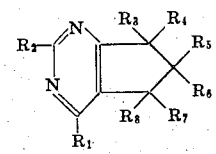

wherein $R_1$ is an alkyl group containing from one to four carbon atoms, an alkoxy group containing from one to four carbon atoms, an alkylthio group containing from one to three carbon atoms, a cycloalkylthio group containing from three to five carbon atoms, or hydrogen, $R_2$ is an alkyl group of from one to four carbon atoms or an alkylthio group of from one to three carbon atoms, $R_3$ through $R_8$ are the same or different and are hydrogen or lower alkyl containing one to three carbon atoms, and $R_1$ and $R_2$ are not both alkylthio.

2. A cyclopentapyrimidine according to claim 1 where $R_1$, $R_3$, $R_4$, $R_5$, $R_6$, $R_7$ and $R_8$ are hydrogen, and $R_2$ is alkyl.

3. A cyclopentapyrimidine according to claim 1 where $R_1$ is alkoxy, $R_2$ is alkyl and $R_3$, $R_4$, $R_5$, $R_6$, $R_7$ and $R_8$ are hydrogen.

4. A cyclopentapyrimidine according to claim 1 where $R_1$ is alkylthio, $R_2$ is alkyl and $R_3$, $R_4$, $R_5$, $R_6$, $R_7$ and $R_8$ are hydrogen.

5. A cyclopentapyrimidine according to claim 1 where $R_1$ is cycloalkylthio, $R_2$ is alkyl and $R_3$, $R_4$, $R_5$, $R_6$, $R_7$ and $R_8$ are hydrogen.

6. A cyclopentapyrimidine according to claim 1 where $R_1$, $R_3$, $R_4$, $R_5$, $R_6$, $R_7$ and $R_8$ are hydrogen and $R_2$ is alkylthio.

7. A cyclopentapyrimidine according to claim 1 where $R_1$, $R_3$, $R_4$, $R_5$, $R_6$, $R_7$ and $R_8$ are hydrogen and $R_2$ is methyl.

8. A cyclopentapyrimidine according to claim 1 where $R_1$ is methoxy, $R_2$ is methyl and $R_3$, $R_4$, $R_5$, $R_6$, $R_7$ and $R_8$ are hydrogen.

9. A cyclopentapyrimidine according to claim 1 where $R_1$ is ethoxy, $R_2$ is methyl and $R_3$, $R_4$, $R_5$, $R_6$, $R_7$ and $R_8$ are hydrogen.

10. A cyclopentapyrimidine according to claim 1 where $R_1$ is n-propoxy, $R_2$ is methyl and $R_3$, $R_4$, $R_5$, $R_6$, $R_7$ and $R_8$ are hydrogen.

11. A cyclopentapyrimidine according to claim 1 where $R_1$ is isobutoxy, $R_2$ is methyl and $R_3$, $R_4$, $R_5$, $R_6$, $R_7$ and $R_8$ are hydrogen.

12. A cyclopentapyrimidine according to claim 1 where $R_1$, $R_3$, $R_4$, $R_5$, $R_6$, $R_7$ and $R_8$ are hydrogen and $R_2$ is methylthio.

13. A cyclopentapyrimidine according to claim 1 where $R_1$ is methylthio, $R_2$ is methyl and $R_3$, $R_4$, $R_5$, $R_6$, $R_7$ and $R_8$ are hydrogen.

14. A cyclopentapyrimidine according to claim 1 where $R_1$ is n-propylthio, $R_2$ is methyl and $R_3$, $R_4$, $R_5$, $R_6$, $R_7$ and $R_8$ are hydrogen.

15. A cyclopentapyrimidine according to claim 1 where $R_1$ is cyclopentylthio, $R_2$ is methyl and $R_3$, $R_4$, $R_5$, $R_6$, $R_7$ and $R_8$ are hydrogen.

* * * * *